United States Patent
Riedy et al.

(10) Patent No.: US 10,061,614 B2
(45) Date of Patent: *Aug. 28, 2018

(54) RESOURCE MANAGEMENT FOR UNTRUSTED PROGRAMS

(71) Applicant: International Business Machines Corporation, Armonk, NY (US)

(72) Inventors: Dale F. Riedy, Poughkeepsie, NY (US); Anthony T. Sofia, Highland, NY (US); Brad D. Stilwell, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,718

(22) Filed: Nov. 14, 2017

(65) Prior Publication Data

US 2018/0060126 A1    Mar. 1, 2018

Related U.S. Application Data

(63) Continuation of application No. 14/962,231, filed on Dec. 8, 2015, now Pat. No. 9,858,119.

(51) Int. Cl.
*G06F 9/46* (2006.01)
*G06F 9/50* (2006.01)
*G06F 21/78* (2013.01)

(52) U.S. Cl.
CPC .......... *G06F 9/5005* (2013.01); *G06F 9/5016* (2013.01); *G06F 21/78* (2013.01)

(58) Field of Classification Search
None
See application file for complete search history.

(56) References Cited

U.S. PATENT DOCUMENTS

| 7,584,473 | B2 * | 9/2009 | Forin | G06F 9/4411 |
| | | | | 717/147 |
| 9,858,119 | B2 * | 1/2018 | Riedy | G06F 9/5005 |
| 2010/0011447 | A1 | 1/2010 | Jothimani | |
| 2012/0042145 | A1 * | 2/2012 | Sehr | G06F 12/1491 |
| | | | | 711/163 |

(Continued)

OTHER PUBLICATIONS

List of IBM Patents or Patent Applications Treated as Related; (Appendix P), dated Mar. 7, 2018; 2 pages.

*Primary Examiner* — Kenneth Tang
(74) *Attorney, Agent, or Firm* — Cantor Colburn LLP; William A. Kinnaman, Jr.

(57) ABSTRACT

Embodiments include method, systems and computer program products for resource management of untrusted programs. In some embodiments, a first request to process an asynchronous event by an untrusted application may be received. The first request may include a host memory address. A counter may be incremented in response to receiving the first request. A device memory address may be retrieved from a device translation table using the host memory address. Processing the first request by a device using the device memory address may be facilitated. A second request to unregister the host memory address may be received. The counter may be determined to be non-zero. An action may be implemented in response to determining that the counter is non-zero.

1 Claim, 4 Drawing Sheets

(56) References Cited

U.S. PATENT DOCUMENTS

2015/0161383 A1 6/2015 Chen et al.
2015/0278513 A1 10/2015 Krasin et al.
2018/0060126 A1 3/2018 Riedy et al.

* cited by examiner

RESOURCE MANAGEMENT FOR UNTRUSTED PROGRAMS

DOMESTIC PRIORITY

This application is a continuation of and claims priority to U.S. patent application Ser. No. 14/962,231, filed on Dec. 8, 2015, entitled "RESOURCE MANAGEMENT FOR UNTRUSTED PROGRAMS" the entire contents of which are incorporated herein by reference.

BACKGROUND

The present disclosure relates to resource management solutions, and more specifically, to methods, systems and computer program products for a management system for resource management for untrusted programs.

Asynchronous events are events in applications that occur independently of the main program flow. Asynchronous actions are actions executed in a non-blocking scheme, allowing the main program flow to continue processing. A common problem with asynchronous events accessing a resource is that the resource may need to remain available for the life of the asynchronous event. For instance, in a computing environment, an I/O mechanism moving data from memory to disk (or vice versa) may be active but if the initiating programs release the memory backing the data, the results may become unpredictable. A trusted program may purge active operations and hold future operations to guarantee there are no active requests in flight. In other scenarios, untrusted programs may be insulated from being able to control the resources (e.g., a data move into trusted storage or by performing an operation to the memory on behalf of the caller) that prevents the untrusted program from freeing it.

SUMMARY

In accordance with an embodiment, a computer-implemented method may be provided. The method may include receiving a first request to process an asynchronous event by an untrusted application. The first request may include a host memory address. A counter may be incremented in response to receiving the first request. A device memory address may be retrieved from a device translation table using the host memory address. Processing of the first request by a device may be facilitated using the device memory address. A second request to unregister the host memory address may be received. The counter may be determined to be non-zero. An action may be implemented in response to determining the counter is non-zero.

In another embodiment, a computer program product may include a non-transitory storage medium readable by a processing circuit and storing instructions for execution by the processing circuit for performing a method comprising: receiving a first request to process an asynchronous event by an untrusted application, wherein the first request comprises a host memory address; incrementing a counter in response to receiving the first request; retrieving a device memory address from a device translation table using the host memory address; facilitating processing the first request by a device using the device memory address; receiving a second request to unregister the host memory address; determining the counter is non-zero; and implementing an action in response to determining the counter is non-zero.

In another embodiment, a system may comprise a processor in communication with one or more types of memory, the processor configured to receive a first request to process an asynchronous event by an untrusted application, wherein the first request comprises a host memory address; increment a counter in response to receiving the first request; retrieve a device memory address from a device translation table using the host memory address; facilitate processing the first request by a device using the device memory address; receive a second request to unregister the host memory address; determine the counter is non-zero; and implement an action in response to determining the counter is non-zero.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

Figure 1:
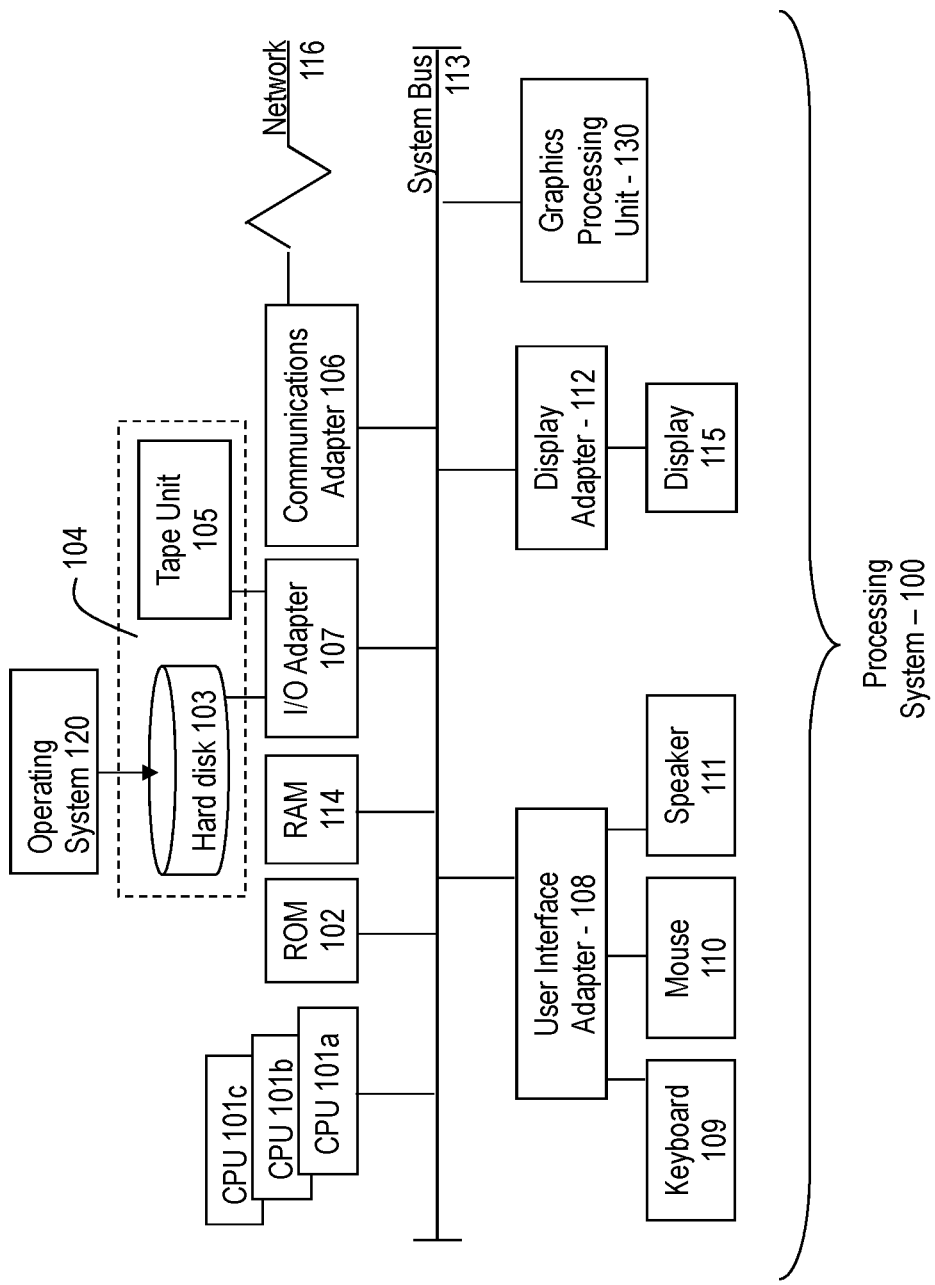
FIG. 1 is a block diagram illustrating one example of a processing system for practice of the teachings herein.

In accordance with exemplary embodiments of the disclosure, methods, systems and computer program products for resource management for untrusted programs. This disclosure is directed to the use of counters to preclude untrusted programs from calling services against specific resources.

In some cases, untrusted programs may need the same granularity as a trusted program with respect to memory management. For example, an untrusted program on a host device may make use of a specific acceleration device that requires special setup for memory to be accessed for processing of asynchronous events. The same real memory of the host device may be addressed by both host virtual addressing as well as directed mapped addressing (DMA) by the accelerator. This may require an untrusted program to set up its memory for DMA access for use by an accelerator. The untrusted program may be permitted to set up and clean up its own memory.

In some embodiments, there may be two levels of counters that may be incremented when a request is issued by an untrusted program. The first counter may be at a connector level and may represent the total number of requests currently executing for a given connector. This may provide a fast lock-out of someone doing a disconnect without having to traverse any additional structures to determine the system state. A second level of counters may be at the memory level. When an untrusted program initiates a call to set up memory, a host memory address provided by the untrusted program may be transcribed and set up in a way that a device (e.g., accelerator device) can understand and the memory itself may be backed by "real" memory. This device-accessible address may be saved by the device driver of the device so the caller does not need to understand the details of the device. When a request is issued by the untrusted program, the device driver may automatically translate the address from a host virtual address to a device-accessible address using a device translation table. When this translation occurs, a second counter may be implemented and related to the virtual address area that has been set up.

When the request completes processing, the device driver can decrement both the connector level counter as well as the counter associated with any memory associated with the request. In order for the asynchronous event handler to know what memory was accessed, this information may be saved before the request is processed and provided back to the event handler through any number of mechanisms. For example, if a clean up memory function is initiated and the counter associated with the memory is non-zero, an action may be implemented. Examples of the action may include failing the request or proceeding request can be honored but only "soft" cleaned up. This would leave the memory effectively set up. However, if an untrusted program attempted to access the memory address for a new request, the request would be denied. The final clean-up can happen in one of two ways: (1) the memory and asynchronous event may be orphaned until the a system exit function call is initiated, at which point all requests will be purged by the system due to the end of the application or (2) when the count reaches zero the cleanup can be safely performed Additionally, the connector counter may prevent a disconnect by the untrusted application to occur while a request is active. This may be useful because it may allow a decision to be made about the disconnect without needing to lock and transverse all of the memory related counts. It also provides a less granular check that can be used before initiating a function for memory cleanup.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
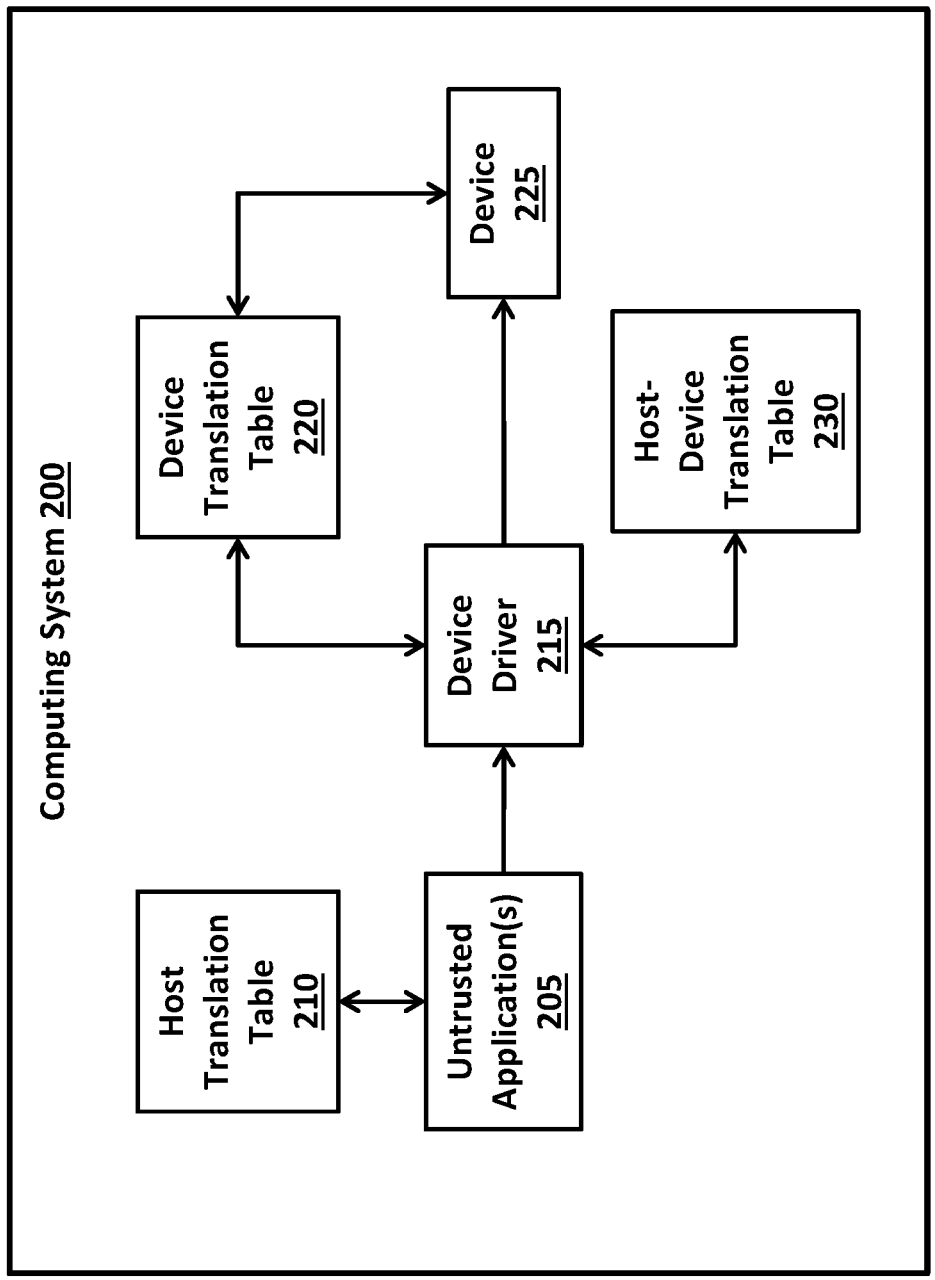
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, one or more untrusted applications 205, a host translation table 210, a device driver 215, a device translation table 220, and/or a device 225.

The untrusted applications 205 may include computer-readable instructions that in response to execution by the processor(s) 101 cause operations to be performed including executing different functionality specific to the application(s) 205. In some embodiments, the untrusted application 205 may use the host memory address to access storage. For example, the untrusted application 205 may have a memory address provided to it through a memory allocation request (e.g., malloc). The memory address may be mapped in the host translation table 210 so that the computer system 200 can translate it into a real address but the untrusted application 205 would not be able to access to the real memory address. The host memory address may be a virtual memory address that is mapped to a physical memory address on the host device. The untrusted application 205 may communicate with the device driver 215 to request processing of an asynchronous event by a device 225. In some embodiments, the untrusted application 205 may initiate a set up memory function call and may include a host memory address. In some embodiments, the set up memory function call may generate a return a token that uniquely identifies the request. The set up memory call may also increment the counter and an increased number of outstanding registrations using a synchronization method.

The device driver 215 may communicate with the device translation table 220. The device driver 215 may facilitate creation of a new entry in the device translation table 220 to map the host memory address to a device memory address. The untrusted application 205 may then issue a request to the device driver 215 for the device 225 to use the host memory address when processing the asynchronous event. In some embodiments, the issue request may update the counter incremented by the set up memory function call. If the number of registrations changes, then the update may be retried. A token provided for the memory must be checked to see if it is valid.

The device driver 215 may use the host-device translation table 230 to translate the host memory address in the request to a device memory address that may be used by the device 225 to process the asynchronous event. Additionally, the device driver 215 may use a device translation table 220 to translate the device memory address to a host real memory address. The device driver 215 may maintain a counter that represents the number of active requests that are operating on a section of memory. In some embodiments, the device driver 215 may increment the counter in response to receiving the request to process the asynchronous event from the untrusted application 205. The device driver 215 may transmit the request to process the asynchronous event, with the device memory address obtained from the device translation table 220 to the device 225 for processing.

In some embodiments, the device 225 may use the device translation table 220 to access the physical memory of the host device by obtaining the mapping of the host real memory address from the device translation table 220 and accessing the host real memory. Upon completion of the processing of the asynchronous event by the device 225, the device driver 215 may update the reference counter for the memory area (e.g., decrement the counter in response to the completion of the processing of the asynchronous event). The untrusted application 205 may then initiate a clean up memory. If the counter is equal to zero, then the memory cleanup may be completed. If the counter is not equal to zero, then the request for memory cleanup may be failed or rejected. In some embodiments, the request may be honored, but only a "soft" cleanup may be implemented, which would leave the memory effectively set up. However, if another application attempted to use the host memory address for a new processing request, the new processing request would be rejected or failed. In some embodiments, the final cleanup may be implemented where the memory and processing of the asynchronous event would be orphaned until a system exit function is called, at which point all requested would be purges and by the system due to the termination of the untrusted application 205. In some embodiments, if the device driver 215 determines the counter has reached zero, the memory cleanup may be safely performed.

Figure 3:
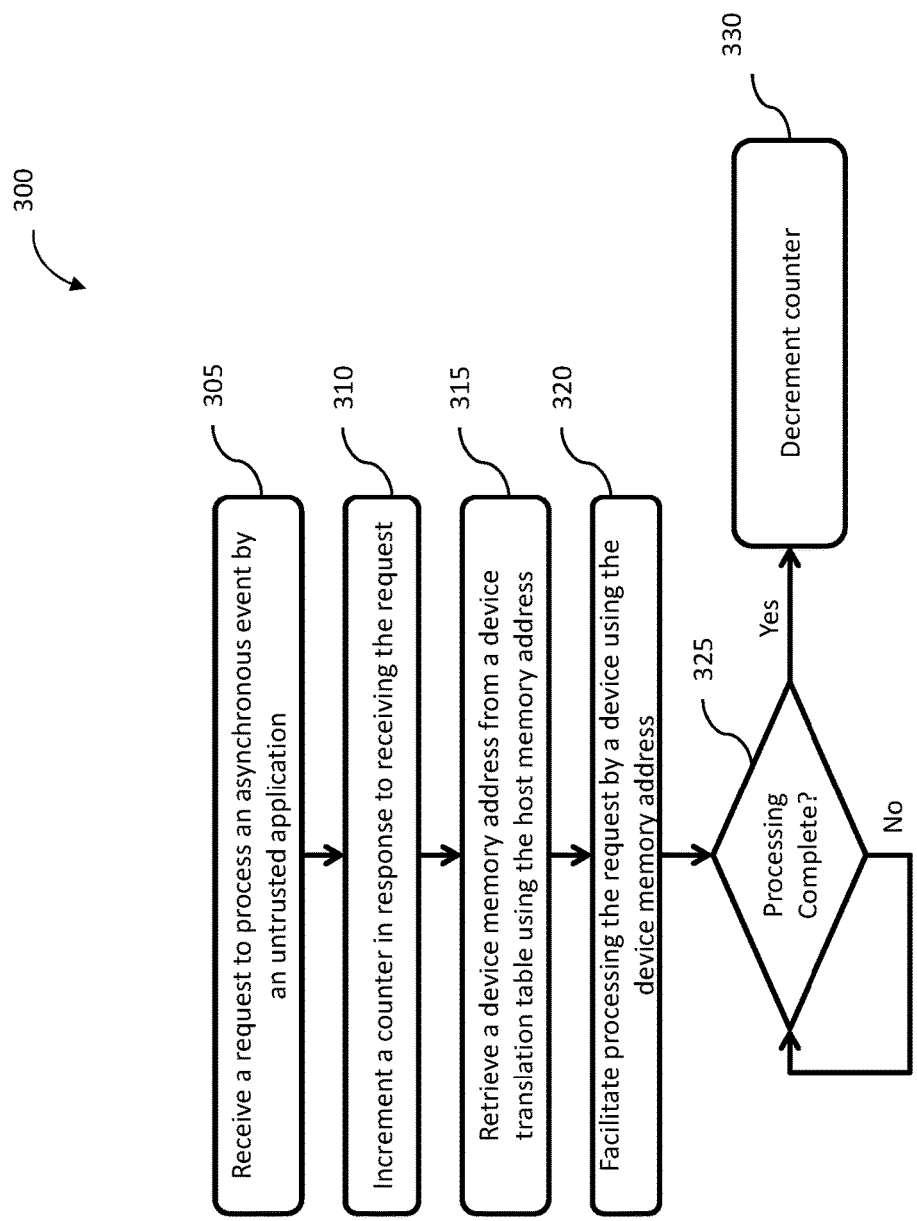
FIG. 3 is a flow diagram of a method for resource management for untrusted programs in accordance with an exemplary embodiment.

Referring now to FIG. 3, is a flow diagram of a method 300 for resource management for untrusted programs in accordance with an exemplary embodiment is shown.

At block 305, a request to process an asynchronous event by an untrusted application 205 may be received. In some embodiments, the request may include a host memory address to use in the processing the asynchronous event.

In some embodiments, prior to receiving the request to process the asynchronous event, the untrusted application 205 may transmit a request to the device driver 215 to register a section of memory for use by the device 225 on behalf of the untrusted application 205. The request to register the section of memory may include the host memory address. The device driver 215 may generate an entry in the device translation table 220. The entry may map an association between the host memory address and a device memory address. In some embodiments, the device translation table 220 may be stored on the host device executing the untrusted application 205. In some embodiments, the device translation table 220 may be stored on the device 225. In some embodiments, the device translation table 220 may be stored on a remote server.

At block 310, a counter may be incremented in response to receiving the first request. In some embodiments, the counter may correspond to a number of active requests operating on an identified memory address (e.g., host memory address). The counter may be maintained by the device driver.

At block 315, a device memory address may be retrieved from a host-device translation table 230 using the host memory address provided in the request to process the asynchronous event. In some embodiments, the device driver 215 may retrieve the device memory address from the host-device translation table 230 in response to receiving the request from the untrusted application 205.

At block 320, processing of the asynchronous event of the request by a device 225 using the device memory address may be facilitated. In some embodiments, the asynchronous event of the request may be processed by the device 225.

At block 325, the device driver 215 may detect or determine whether the processing of the request (e.g., the asynchronous event) has been completed. If at block 325, the device driver 215 determines that processing of the asynchronous event has been completed, the method may proceed to block 330. At block 330, the device driver 215 may decrement the counter in response to determining the processing has been completed.

If at block 325, the device driver 215 determines the processing of the request has not been completed, the method may return to block 325. In some embodiments, the device driver 215 may make another determination after a predetermined amount of time has passed (e.g., five seconds). In some embodiments, the device driver 215 may determine that the processing has failed if the processing has not been completed within a predetermine amount of time (e.g., one hour). If the device driver 215 determines the processing has failed, the device driver 215 may terminate the process and may decrement the counter.

Figure 4:
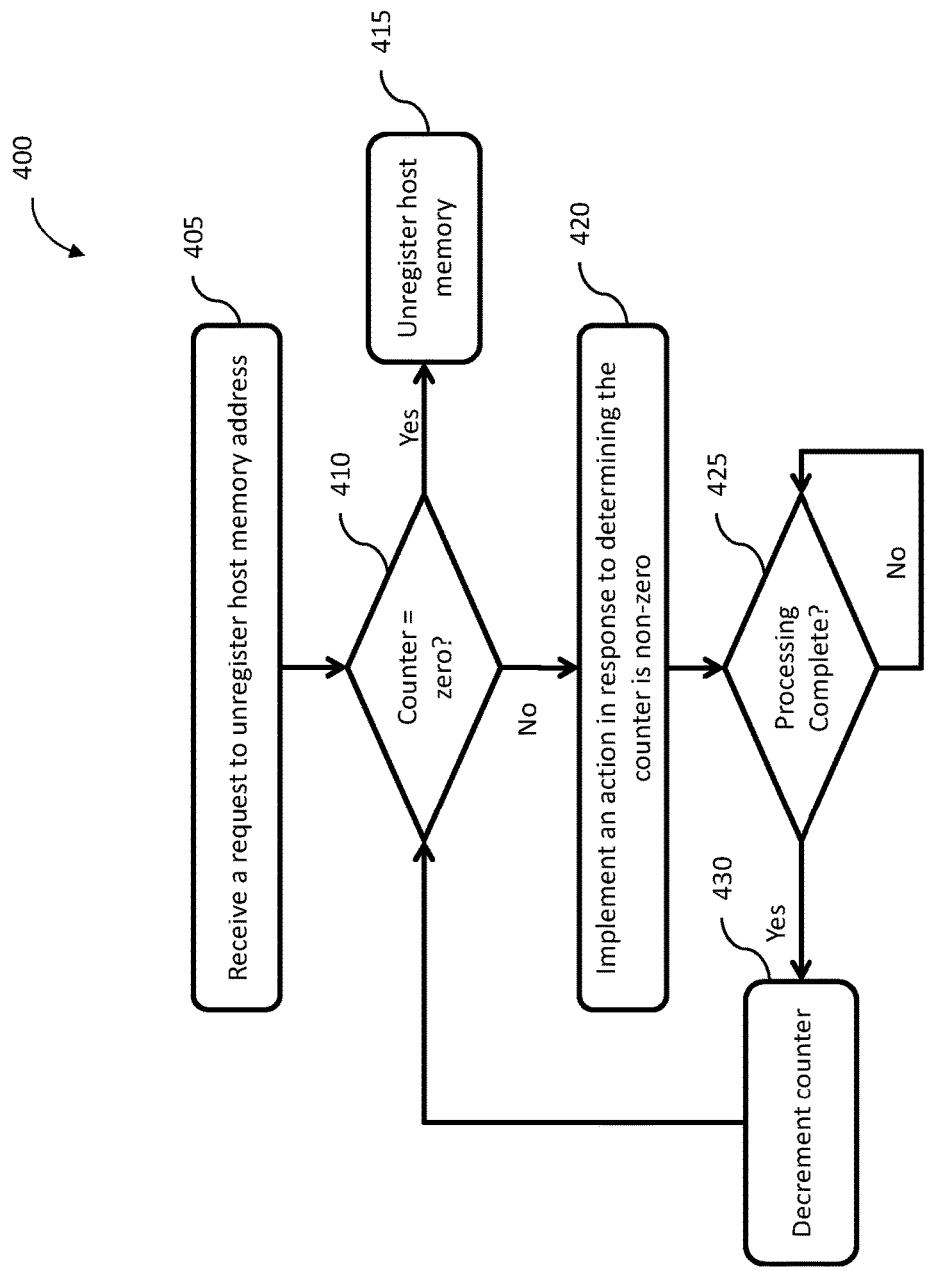
FIG. 4 is a flow diagram of another method for resource management for untrusted programs in accordance with an exemplary embodiment.

Referring now to FIG. 4, is a flow diagram of a method 400 for resource management for untrusted programs in accordance with an exemplary embodiment is shown.

At block 405, a request to unregister the host memory address may be received. In some embodiments, the device driver 215 may receive the request from the untrusted application 205. The request may be received before an asynchronous event (e.g., from FIG. 3) has finished being processed by the device 225.

At block 410, a determination may be made to determine if the counter is at zero. In some embodiments, the device driver 215 may determine whether the counter is at zero in response to receiving the request from the untrusted application 205.

If at block 410, it is determined that the counter is at zero, then the method may proceed to block 415. At block 415, the device driver 215 may unregister the host memory address. The device driver 215 may modify the device translation table 220 to remove or modify the entry mapping the host memory address to the device memory address. In some embodiments, the device driver 215 may facilitate generation of a notification to the untrusted application 205 indicating that the host memory address has been unregistered.

If at block 410, it is determined that the counter is a non-zero, then the method may proceed to block 420. At block 420, an action may be implemented in response to determining the counter is non-zero. In some embodiments, the device driver 215 may fail or reject the request. The device driver 215 may facilitate the generation of a notification to the untrusted application 205 that the request has failed or is rejected. In some embodiments, the device driver 215 may defer the request until the processing of the asynchronous event is complete. Upon completion of the processing of the asynchronous event, the method may proceed to block 425.

At block 425, the device driver 215 may determine whether processing of the asynchronous event has completed. If the device driver 215 determines the processing has completed, then the method may proceed to block 430. At block 430, the device driver 215 may decrement the counter in response to determining that the asynchronous has been processed by the device 225. The method may proceed back to block 410, where the device driver determines whether the counter is at zero.

If at block 425, the device driver 215 determines that processing the asynchronous event has not been completed by the device 225, the method may return to block 425. The device driver 215 may make determinations related to the status of the asynchronous event at predetermined time intervals (e.g., every two seconds) until the event has been processed by the device 225. In some embodiments, the device driver 215 may receive a notification from the device 225 indicating that the processing has been completed.

In some embodiments, the device 225 may be unable to complete processing of the asynchronous event (e.g., device failure). The device driver 215 may reset the counter to zero upon determining the device 225 has failed or receiving an indication that the device 225 has failed. In some embodiments, the device driver 215 may determine that the device 215 has failed if it does not receive any communication from the device 215 for a predetermined time period (e.g., one hour).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:

receiving a first request to process an asynchronous event by an untrusted application, wherein the first request comprises a host memory address;

incrementing a counter in response to receiving the first request;

retrieving a device memory address from a device translation table using the host memory address;

facilitating processing the first request by a device using the device memory address;

receiving a second request to unregister the host memory address;

determining that the counter is non-zero;

implementing an action in response to determining that the counter is non-zero, wherein the counter corresponds to a number of active requests operating on an identified memory address;

receiving a third request to register a section of memory for use by the device for the untrusted application, wherein the third request comprises the host memory address; and generating an entry in the device translation table mapping the host memory address to the device memory address.

\* \* \* \* \*